(No Model.) 3 Sheets—Sheet 1.

A. B. FARQUHAR, J. A. JONES & H. W. EISENHART.
FERTILIZER DISTRIBUTER AND PLANTER.

No. 256,430. Patented Apr. 11, 1882.

WITNESSES
Wm A. Skinkle
Geo. W. Breck

By their Attorney

INVENTORS
Arthur B. Farquhar,
John A. Jones,
Henry W. Eisenhart.

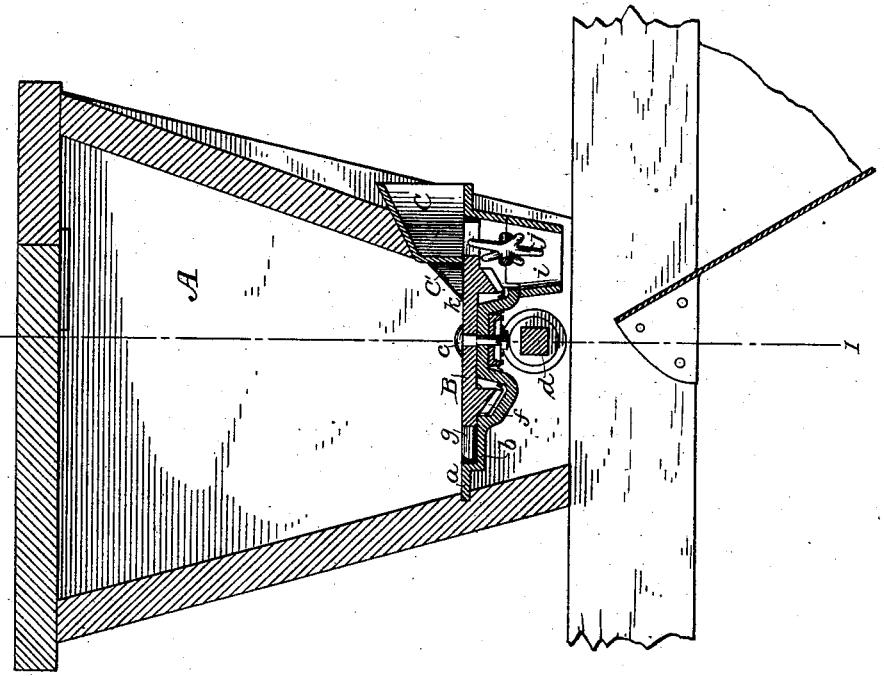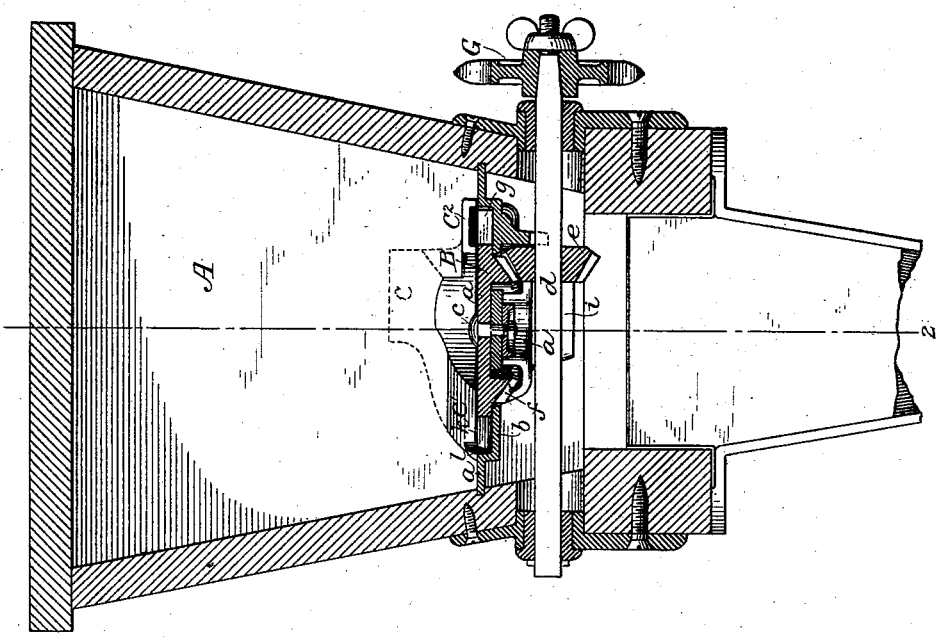

(No Model.) 3 Sheets—Sheet 3.
A. B. FARQUHAR, J. A. JONES & H. W. EISENHART.
FERTILIZER DISTRIBUTER AND PLANTER.
No. 256,430. Patented Apr. 11, 1882.
Fig. 4,
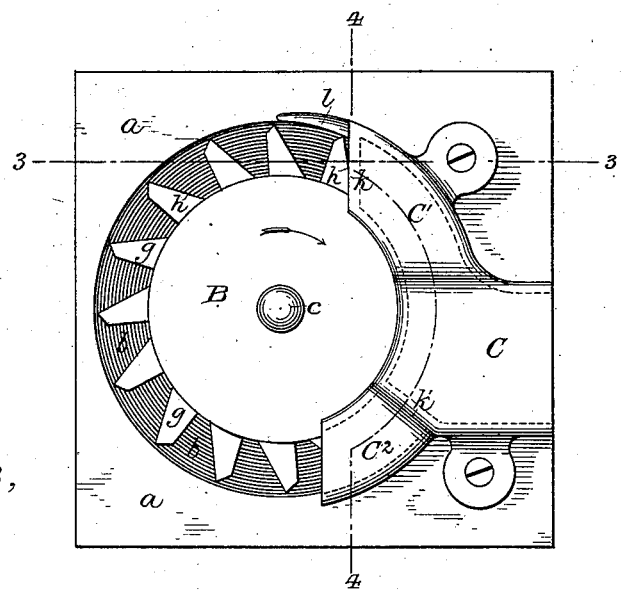
Fig. 8,
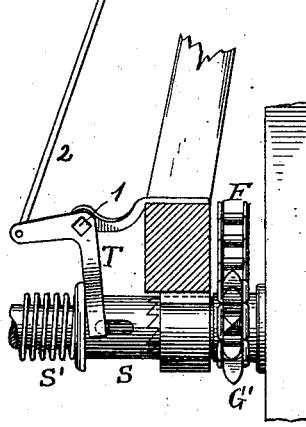
Fig. 5,
Fig. 9,
Fig. 10,
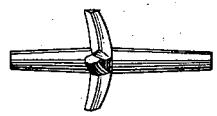
Fig. 6,
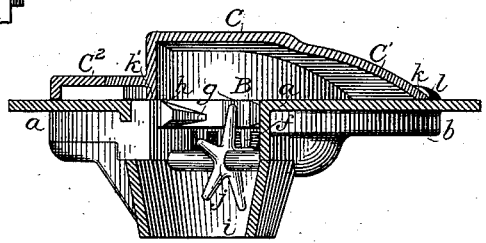
WITNESSES
Wm A. Skinkle.
Geo W. Breck
By their Attorney
W Bailey
INVENTORS.
Arthur B. Farquhar,
John A. Jones,
Henry W. Eisenhart.

UNITED STATES PATENT OFFICE.

ARTHUR B. FARQUHAR, JOHN A. JONES, AND HENRY W. EISENHART, OF YORK, PENNSYLVANIA, ASSIGNORS TO SAID FARQUHAR AND JONES.

FERTILIZER-DISTRIBUTER AND PLANTER.

SPECIFICATION forming part of Letters Patent No. 256,430, dated April 11, 1882.

Application filed July 16, 1881. (No model.)

*To all whom it may concern:*

Be it known that we, ARTHUR B. FARQUHAR, JOHN A. JONES, and HENRY W. EISENHART, of York, in the State of Pennsylvania, have invented certain new and useful Improvements in Fertilizer-Distributers and Planters, of which the following is a specification.

Our invention principally has reference to fertilizer-distributers in which a rotating toothwheel is used as the agent by which the fertilizing material is conveyed to the discharge-opening in the hopper. It also has reference to the gearing by which the moving parts of the distributer, as well as those of the planter with which the distributer may be combined, are driven.

Our improvement in the distributer consists mainly in combining with the toothed distributing-wheel a scraper or blade arranged over said wheel and in such relation thereto that it will act, in conjunction with the successive teeth of the revolving feed-wheel as they pass along to the discharge-opening, as shears to cut strings, feathers, and other substances mixed with the fertilizing material, which, if not thus disposed of, would choke the discharge and impede the feed.

Our improvement in the gearing resides principally in the chain and chain-wheels hereinafter described for imparting movement both to the planting or seed-dropping apparatus and the fertilizer-distributer, combined with a tightening-wheel adjustable so as to permit different sizes of pinions or toothed wheels to be used for the purpose of varying the feed of the planter or distributer, or both, without shortening or lengthening the chain.

Our invention consists, further, in certain improvements in the form of the clearing-wheel, and in mechanism whereby the planting and distributing devices can be dropped and started at pleasure, which will be hereinafter pointed out.

The nature of our invention and the manner in which the same is or may be carried into effect will be understood by reference to the accompanying drawings, in which—

Figure 1:
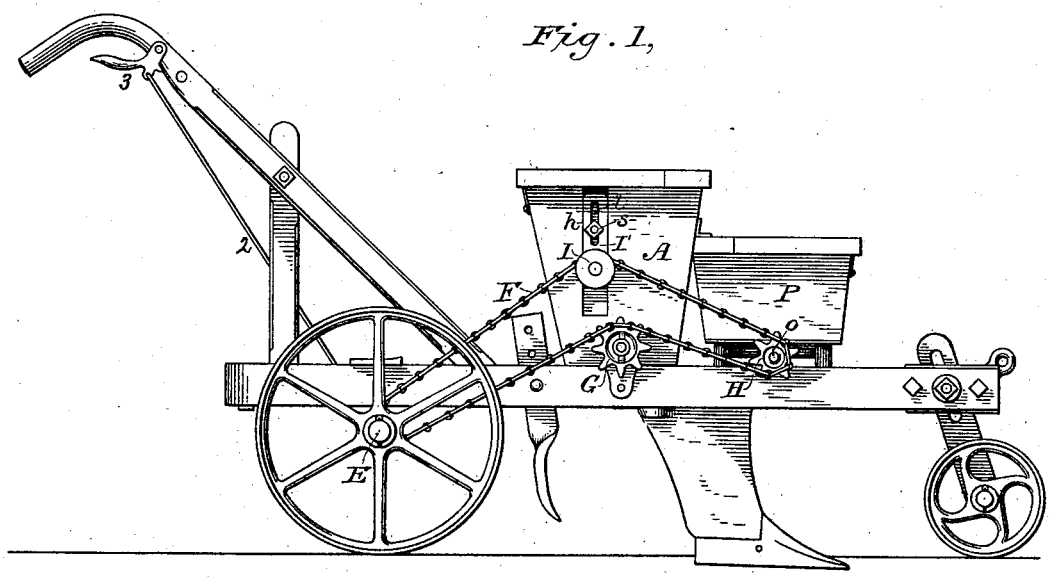
Figure 7:
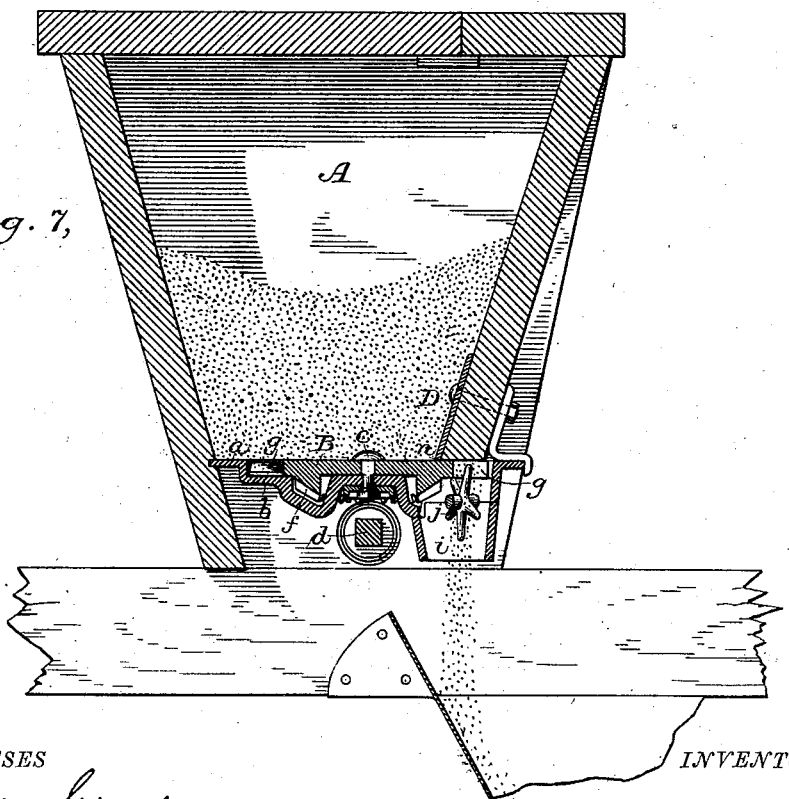

Figure 1 is a side elevation of a corn-planter embodying our improvements. Fig. 2 is a vertical section of the fertilizer-distributing hopper on line 1 1, Fig. 3. Fig. 3 is a section of the same on line 2 2, Fig. 2. Fig. 4 is a plan of the bottom of the said hopper, showing the feed-wheel and the preferred form of scraper. Fig. 5 is a section on line 3 3, Fig. 4. Fig. 6 is a section on line 4 4, Fig. 4. Fig. 7 is a vertical central section of the hopper, representing a modified form of scraper. Fig. 8 is an end elevation of a part of the machine, representing the clutch mechanism. Figs. 9 and 10 are views of the preferred form of clearing-wheel.

A is the fertilizer box or hopper, the sides of which preferably incline or slant toward the bottom, which we prefer should consist of a cast-metal plate, $a$, formed with a recess, $b$, for the reception of the horizontal toothed feed-wheel B. This feed-wheel is pivoted to the bottom by a pin or bolt, $c$, and is revolved by means of the rotary shaft $d$, mounted beneath the bottom of the hopper in bearings on the hopper or on the frame of the machine to which the hopper may be attached, as seen in Fig. 2. Shaft $d$ carries a beveled pinion, $e$, which engages a set of corresponding teeth, $f$, formed on or attached to the under side of the feed-wheel and projecting down through the bottom $a$. The direction of rotation of the feed-wheel is indicated by the arrow in Fig. 4. The feed-wheel is provided with horizontally-projecting teeth $g$, which serve to feed along the fertilizing material or compound in definite and ascertained quantity. These teeth are set obliquely, their front faces inclining to the rear, (relatively to the direction of movement,) and the top edges, $h$, of these faces constitute cutting-edges, which, in conjunction with the cutting-edge of the scraper, hereinafter described, constitute in effect shears to cut foreign matter—such as strings and the like—that may be carried along under the scraper.

The bottom $a$ is provided with a discharge-opening, $i$, over which the feed-wheel teeth pass, each tooth in succession carrying along in front of it a definite quantity of the fertilizing material, which, as the tooth comes over the discharge-opening, drops therein and is conducted off through the usual boot or tube. In the opening $i$ is obliquely set a toothed clearing-wheel, $j$, which engages and is rotated by the teeth of the feed-wheel, and serves to clear said teeth of any fertilizing material that may stick between them.

We prefer in practice to use a clearing-wheel of the form shown in Figs. 9 and 10. As there shown, the teeth are curved or inclined in two directions—laterally, as seen in Fig. 10, and in the plane of revolution of the wheel, as seen in Fig. 9. Each spoke or tooth has also beveled faces, which allow the teeth of the feed-wheel to enter between the teeth of the clearing-wheel with more facility, and also permit the latter to be made larger and stronger than otherwise would be the case.

The teeth, owing to their compound curvature, act more efficiently to brush or scrape the teeth of the feed-wheel, particularly the upper outer ends of the latter, and they allow the wheel to revolve more easily and readily than would be the case were they otherwise shaped.

The preferred form of scraper which we employ is shown in Figs. 4 to 6, inclusive. It is not only a scraper, but a cap or shield as well, in the latter capacity serving to cover the discharge-opening $i$, so that no fertilizing material can pass thereto, except such as is carried along in the recess $b$ between the teeth of the feed-wheel, and serving also to cover a considerable portion of the feed-wheel, thus preventing the movement of the latter from unduly distributing the fertilizing material. This combined scraper and cap or shield is preferably made of a single casting of the form shown in the figures referred to, having a body, C, which covers the opening $i$, and curved branching arms $C'$ $C^2$, which extend out over and cover a considerable portion of the feed-wheel teeth. The front edge, K, of the arm C is flush with the top of the recess $b$, and this portion of the device constitutes what we have termed the "scraper," the edge being a stationary cutting-edge, which, as shown in Figs. 4 and 5, will act, in conjunction with the edge $h$ of each feed-tooth passing beneath it, to shear or cut twine, feathers, and other foreign matters that may be intermingled with the fertilizer. There is in advance of the cutting-edge $k$ and along the upper edge of the recess $b$ a vertical guard ledge or flange, $l$, which serves to prevent strings and the like from being drawn under between the outer side portion of the part $C'$ and the bottom plate, $a$. We find that a scraper or cutter thus arranged to co-operate with the feed-teeth is very efficient to prevent the feed from being clogged or obstructed, and the oblique set of the cutting-edges $h$ of the teeth aids materially in the accomplishment of this result. It sometimes happens, however, that obstructions escape the edge $k$ and are carried around with the feed-wheel teeth. To dispose of these obstructions and to prevent them from clogging up the passage formed between the teeth and the concave arm $C^2$ of the cap or shield, we form on the far side of the feed orifice another scraping or cutting rib or edge in the cap, as seen at $k'$, Figs. 4 and 6. The feed-wheel teeth $a$, that pass along under the part $k'$, act in conjunction with it just as with the edges $k$.

The scraper is bolted to the bottom plate, $a$, and can be readily applied to and removed therefrom. We have described the form and arrangement of scraper which, on the whole, we prefer to employ. We wish it to be understood, however, that the same may be modified to a considerable extent without departure from our invention. We can, for instance, employ in connection with the feed-wheel a plate such as shown at D, Fig. 7, bolted firmly to the side of the hopper, with it lower scraping or cutting edge, $n$, extending across the feed-wheel and in such proximity to the feed-wheel teeth as to operate in connection therewith in the same way as hereinbefore described with reference to the cutting or scraping edge $k$.

We drive the shaft from the wheeled axle E of the machine (shown in Fig. 1) by means of an endless chain, F, which we also make use of to drive the feed-shaft $o$ of the planting apparatus P. To this end the chain passes from a chain-wheel, $G'$, on the axle over a chain-wheel, G, on shaft $d$, thence around a chain-wheel, H, on the planter feed-shaft $o$, and thence back to the chain-wheel on the axle, passing over an intermediate wheel or pulley, I, which we use as a means of adjusting the chain. To this end we mount said wheel I upon a base-plate, $I'$, which is held in vertical guides $h$ on the fertilizer-hopper, between which guides it can move, being held when adjusted to any desired position by a set-screw or bolt, $s$, passing into the side of the hopper through a slot, $t$, in the base-plate, as shown. By moving the wheel up or down we can tighten or loosen the chain at pleasure.

In the practical use of machines of this kind it is frequently necessary to vary the feed, and to do this pinions or toothed wheels G H of various sizes must be used.

By the employment of the tightening-wheel under the arrangement just described, we are enabled to replace at any time the toothed wheels by others of different sizes without shortening or lengthening the chain.

It is at times necessary to arrest movement of the distributing and planting devices while the machine is traveling. To this end the chain-wheel $G'$ is loose on axle E, and is engaged by a spring-clutch, S, which slides on the axle, but revolves continuously therewith. The spring $S'$ holds the clutch normally in engagement with the wheel G. An angle-lever, T, pivoted at 1 to the frame of the machine, engages at one end the clutch, and at the other end is jointed to a connecting-rod, 2, which at its upper end is jointed to the lever-handle 3, pivoted to one of the handles of the planter in a position where it may conveniently be taken hold of or pressed by the operator without requiring him to remove his hand from the main handle. This arrangement is simple, convenient, and effective for the purpose above indicated.

Having described our invention, what we claim, and desire to secure by Letters Patent, is—

1. The combination, with the fertilizer hopper or box and the horizontal rotating feed-wheel provided with teeth formed with cutting-edges, of a scraper secured within the box above the feed-wheel, and provided with a cutting-edge arranged with respect to and adapted to co-operate with the teeth of the feed-wheel successively passing beneath it, substantially as hereinbefore set forth.

2. The obliquely-toothed horizontal feed-wheel and the box or hopper in which the same is mounted, in combination with a scraper provided with a cutting-edge arranged with respect to and adapted to co-operate with the teeth of the feed-wheel, substantially as hereinbefore set forth.

3. The combination of the hopper provided with a bottom having a feed-wheel-receiving recess, as described, the horizontal rotating toothed feed-wheel mounted in said recess, and the scraper formed with a cutting-edge to co-operate with the teeth of the feed-wheel, substantially as and for the purposes hereinbefore set forth.

4. The scraper formed with a cutting-edge to co-operate with the feed-wheel teeth, and arranged, substantially as herein described, so as to cover the discharge-opening and part of the feed-wheel, in combination with the hopper or box and the horizontal rotating toothed feed-wheel, substantially as set forth.

5. In combination with the hopper and the horizontal rotating toothed feed-wheel, the scraper formed and arranged to cover the discharge-opening and part of the feed-wheel, and provided with two cutting-edges, one in front and one in rear (relatively to the direction of rotation of the feed-wheel) of the discharge-orifice, adapted to co-operate with the teeth of the feed-wheel, substantially as hereinbefore set forth.

6. The combination of the fertilizer and seed hoppers, the feed-shaft, the pinions or chain-wheels, the chain, and the adjustable tightening pulley or wheel, under the arrangement and for operation as hereinbefore set forth.

7. The tooth-clearing wheel formed with teeth inclined both laterally and in the plane of revolution of the wheel, substantially as and for the purposes hereinbefore described, and illustrated in Figs. 9 and 10 of the accompanying drawings.

In testimony whereof we have hereunto set our hands this 28th day of May, 1881.

ARTHUR B. FARQUHAR.
JOHN A. JONES.
HENRY W. EISENHART.

Witnesses:
  JNO. H. HOSHOUR,
  W. BEITZEL.